Aug. 6, 1940.     E. GINN     2,210,453
GASKET
Filed April 17, 1937
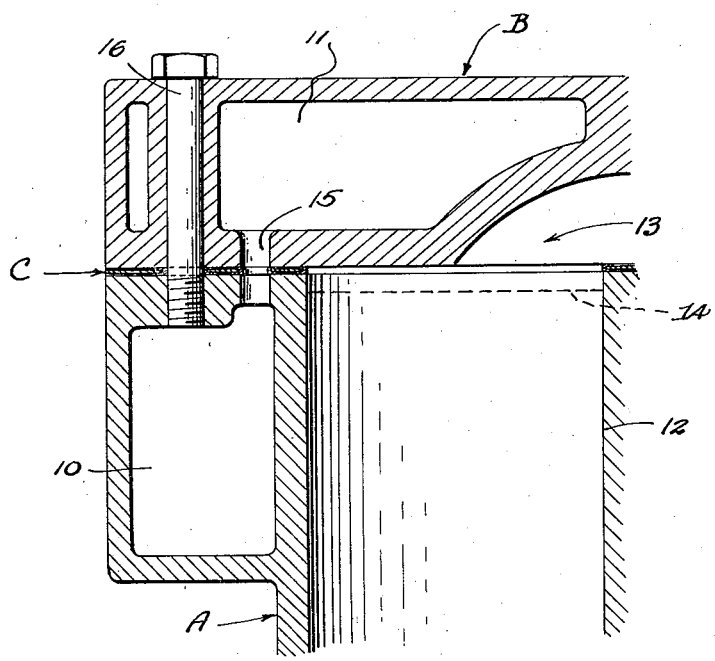
Fig.1.
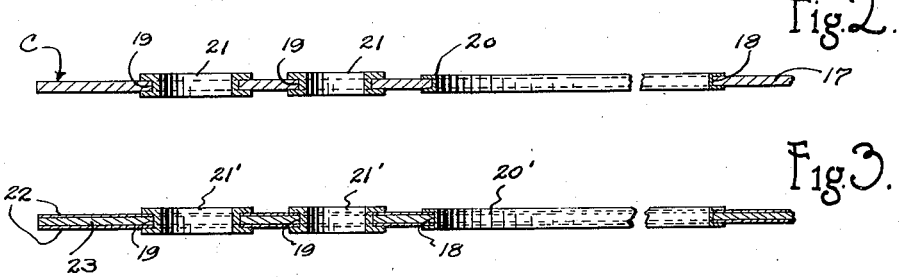
Fig.2.
Fig.3.
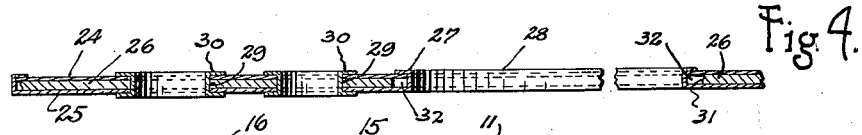
Fig.4.
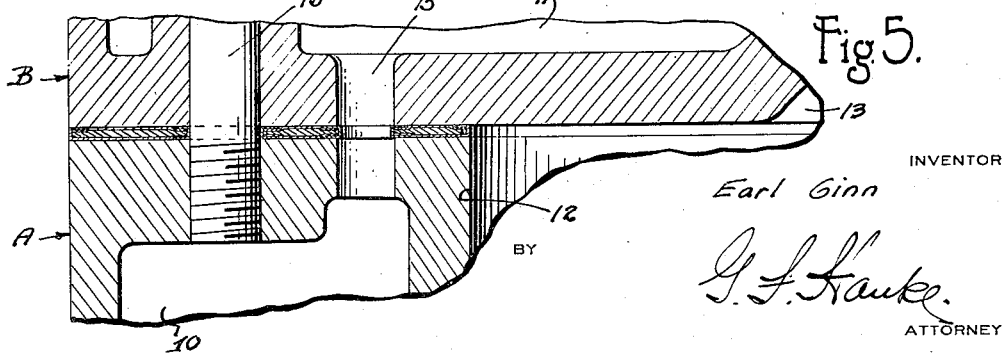
Fig.5.
INVENTOR
Earl Ginn
BY
G. F. Hauke.
ATTORNEY Patented Aug. 6, 1940

2,210,453

UNITED STATES PATENT OFFICE 2,210,453

GASKET

Earl Ginn, North Muskegon, Mich., assignor, by mesne assignments, to Reconstruction Finance Corporation, Detroit, Mich., a corporation of the United States Application April 17, 1937, Serial No. 137,489

5 Claims. (Cl. 288—21)

This invention relates to engines and more particularly to the gasket structure incorporated between the cylinder head and cylinder block of an internal combustion engine.

The present day engines preferably employ an all metal cylinder head gasket since it is found that these stand up much better than the cork gaskets which had been previously employed. It is found, however, that it is difficult to obtain satisfactory sealing with a metal gasket, particularly a satisfactory sealing of both the combustion space and water passages. If sufficient grommeting is made to prevent escape of gases under the tremendous pressure and temperatures developed in the combustion chamber, it is very likely that some portion of one or more of the water passages will not be satisfactorily sealed against leakage. In a large gasket such as is used for sealing the joint between the cylinder head and cylinder block of an engine, it is difficult to apply a uniform pressure over the entire surface of the gasket and consequently it is found that some of the passages are not sealed as tight as others and sometimes there is a definite leak. This difficulty in obtaining a uniform seal for all passages has resulted in a subsequent leak occurring at some future time in some of said passages, but, prior to the normal life which is expected to be had from this gasket construction.

An object of this present invention is to obtain substantially perfect seal for all joints, one which will adequately seal the combustion space as well as all water passages, by providing a gasket structure embodying grommets of temperature resisting material around the combustion chamber space and over-size grommets of a material which may be less resistant to temperature but is preferably of a yielding material which may be readily distorted when the cylinder head is seated on said gasket under pressure.

Another object of the present invention is to provide over-size yielding grommets for some of the openings in said gasket and which are secured peripherally to said openings and distorted under pressure without interfering with the adequate seating of the cylinder head in such a way as to efficiently seal the combustion chamber space. This is carried out in the present invention by employing a relatively hard metal grommet for association with the opening in the gasket associated with the combustion chamber space and relatively soft over-size grommets associated with other openings in the gasket structure.

A further object of the present invention is to provide an improved gasket structure of long life and which serves to adequately seal the combustion chamber space as well as the water passages but which retains all the advantages which are had by the use of an all-metal gasket.

For a more detailed understanding of this invention reference may be had to the accompanying drawing illustrating preferred embodiments of the invention, and in which:

Fig. 1 is a fragmentary vertical sectional view through a portion of an engine and illustrating a gasket secured in place between the cylinder block and cylinder head for sealing the combustion chamber space and a water passage, Fig. 2 is a detail sectional view through a portion of the gasket, Fig. 3 is a cross-sectional view through a gasket illustrating another embodiment of the invention, Fig. 4 is a similar cross sectional view through a gasket illustrating another embodiment of the invention, and Fig. 5 is a fragmentary detail view through an engine structure illustrating the compressed condition of a gasket as illustrated in Fig. 4 and which is assembled between the cylinder block and cylinder head.

In the accompanying drawing the present invention is illustrated in connection with a conventional engine structure including a cylinder block A and a cylinder head B, which are respectively jacketed as at 10 and 11 for the circulation of a cooling medium through the engine. The engine block has a cylinder 12 and there is provided the usual combustion chamber space 13 which is here shown as lying substantially within the cylinder head, but also is contained partially within the cylinder 12. The dotted line 14 indicates the outermost position of travel of a piston operating in said cylinder 12. The cylinder and cylinder head jackets 10 and 11 respectively, are connected together by a passage 15 and the cylinder head is bolted down to the cylinder block by means of a bolt or other suitable securing means 16. A gasket C is arranged to be secured intermediate the cylinder block and cylinder head and is tightly squeezed therebetween to seal the joints between said cylinder head and block around the combustion chamber space 13 and the one or more passages 15.

In Fig. 2 I have illustrated one form of gasket structure designated in its entirety by reference character C which consists of a sheet metal plate 17 preferably of copper or some other similar material and which is provided with a relatively large opening 18 cooperating with the cylinder and combustion chamber of the engine and a plurality of other openings 19 cooperating with other passages in the engine structure, preferably the passages 15 which place the cylinder and cylinder head jackets in communication for the circulation of a cooling medium therethrough. The opening 18 is provided with the conventional relatively hard metal gasket 20 such as copper which is resistant to relatively high temperatures and is not deteriorated by the high temperatures and pressure developed within the combustion chamber 13. These copper or relatively hard metal grommets 20 are secured peripherally to opening 18 and other grommets constructed of a different material and having different characteristics are secured peripherally to the openings 19. The grommets 21 which are secured peripherally to these openings 19 are preferably oversize as shown in Fig. 2 and constructed of a relatively soft metal which is readily distorted and which may be less resistant to relatively high temperatures than the grommets 20. The essential characteristic of these grommets 21 is that they be readily distorted and formed of a relatively soft metal as compared to the grommets 20. On securing down the cylinder head B to a cylinder block A when using a gasket as shown in Fig. 2, it will be observed that these relatively soft metal grommets 21 which are preferably constructed of lead or other similar metal are easily compressed as compared to the substantially non-compressible grommets 20, the cylinder head is drawn down tight until the same seats on grommets 20, thus effectively sealing the combustion chamber space and at the same time the cylinder head seats on grommets 21 which are readily distorted in order to permit said cylinder head to properly seat.

In Fig. 3 I have illustrated a modified form of construction which employs grommets 20' and 21' of substantially the same construction as the grommets employed with the gasket shown in Fig. 2, but the gasket proper is formed of a laminated structure, preferably comprising outer copper seats 22 which may be relatively thin and which are secured on either side of an inner metal sheet 23 which may be of relatively soft yielding metal if so desired. The operation of seating the cylinder head on the gasket shown in Fig. 3 is substantially similar to the operation as described in connection with the gasket shown in Fig. 2.

In Fig. 4, however, a further modified form of gasket structure is illustrated and this construction preferably consists of the outer upper and lower relatively hard metal sheets 24 and 25 respectively, which are preferably constructed of copper or other similar metal and an intermediate relatively soft metal layer 26, preferably constructed of lead or other similar yielding material. Preferably the lower copper sheeting 25 is provided with a return bent flange portion 27 which defines an opening 28 which is adapted to be associated with the combustion chamber space, and it will be thus noted that the intermediate soft metal layer 26 which is usually of lead is here shielded from the temperatures in the combustion chamber. This main gasket body portion is provided with additional openings 29 which are adapted to be associated with the water passages of the engine and the grommets 30 are secured peripherally to these openings 29, said grommets 30 being preferably constructed of relatively hard metal such as copper. It will be noted that the intermediate soft metal yielding layer 26 is provided with an opening 31 cooperating with the opening 28 but which is substantially larger in diameter or overall dimension so as to provide a clearance space 32 allowing for expansion of said relatively soft metal intermediate the gasket portion.

In securing the gasket as shown in Fig. 4 between a cylinder block A and cylinder head B of an engine by means of the hold-down bolt 16, it will be noted that the gasket structure is compressed, that is, the pressure tends to squeeze or distort the inner yielding soft metal member. The return bent portions 27 of the gasket structure are squeezed together and likewise the grommets 30 are squeezed together which action is permitted by the yielding character of the central or intermediate layer of material. The distortion of this metal is permitted by the clearance 32 and it will be noted that the soft metal will flow and substantially displace this clearance space 32, and as a result it will be noted that there is had a solid metal gasket which functions to substantially and efficiently seal the combustion chamber space as well as the passages 15.

It will be apparent to those skilled in the art to which my invention pertains that various modifications and changes may be made therein without departing from the spirit of my invention or from the scope of the appended claims.

What I claim as my invention is:

1. A sheet metal gasket for an internal combustion engine and having a plurality of openings, a substantially non-compressible relatively hard metal grommet secured peripherally to one of said openings bounding a combustion chamber, and a yielding relatively soft metal grommet having a thickness relatively greater than the thickness of said hard metal grommet aforesaid, and secured peripherally to another of said openings which is not subjected to the relatively high pressures of the combustion chamber.

2. A built up gasket structure for assembly under pressure between a pair of internal combustion engine structures to seal internal passages connecting said structures and having a plurality of openings therein respectively associated with said internal passages connecting said structures, a substantially non-compressible relatively hard metal grommet secured peripherally to one of said openings bounding the engine combustion chamber, and a yielding relatively soft metal grommet having a thickness relatively greater than the thickness of said hard metal grommet aforesaid, and secured peripherally to another of said openings which is not subjected to the relatively high pressures of the combustion chamber, said soft metal grommet being relatively distorted by pressure seating said structures in sealing relation on said relatively hard metal grommet.

3. An engine gasket having a plurality of openings and including a copper sheet, a substantially non-compressible copper grommet secured peripherally to one of said openings bounding the engine combustion chamber, and a soft metal yielding grommet having a thickness relatively greater than the thickness of the copper grommet aforesaid, and secured peripherally to another of said openings which is not subjected to the relatively high pressures of the combustion chamber.

4. An engine gasket having a plurality of openings and including a copper sheet, a substantially non-compressible copper grommet secured peripherally to one of said openings bounding the engine combustion chamber, and a lead grommet having a thickness relatively greater than the thickness of the copper grommet aforesaid, and secured peripherally to another of said openings which is not subjected to the relatively high pressures of the combustion chamber.

5. An engine gasket having a plurality of openings and including a copper sheet, a relatively high temperature resisting and substantially non-compressible grommet secured peripherally to one of said openings bounding the engine combustion chamber and effecting an adequate fluid pressure seal, and a relatively low temperature resisting and yielding grommet having a thickness relatively greater than the thickness of said first mentioned grommet, and secured peripherally to another of said openings which is not subjected to the relatively high pressures of the combustion chamber.

EARL GINN.